G. HIPWOOD.
CAR FENDER.
APPLICATION FILED NOV. 26, 1909.
967,917.
Patented Aug. 23, 1910.
2 SHEETS—SHEET 1.
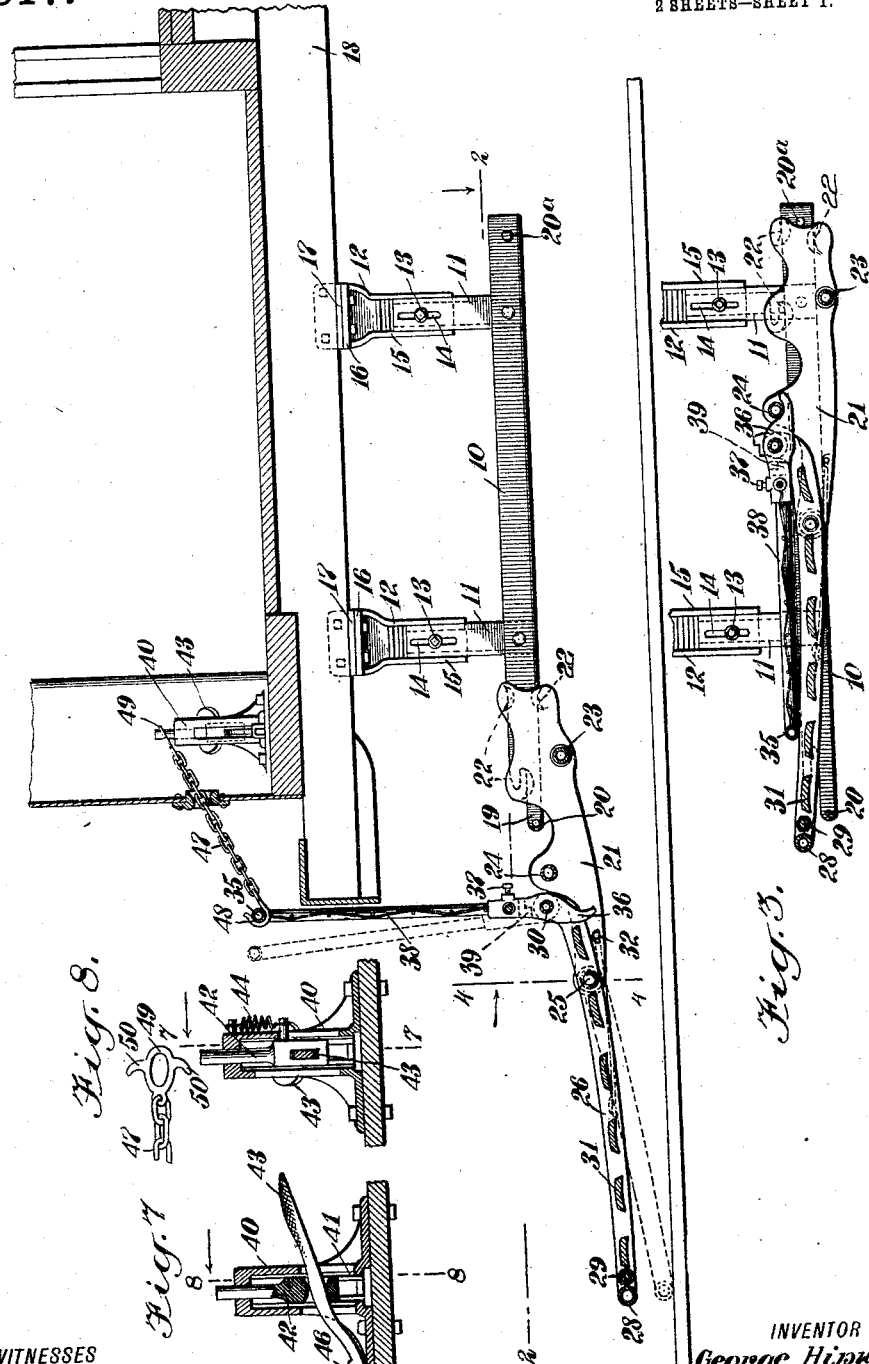
INVENTOR
George Hipwood
BY Munn & Co
ATTORNEYS
WITNESSES

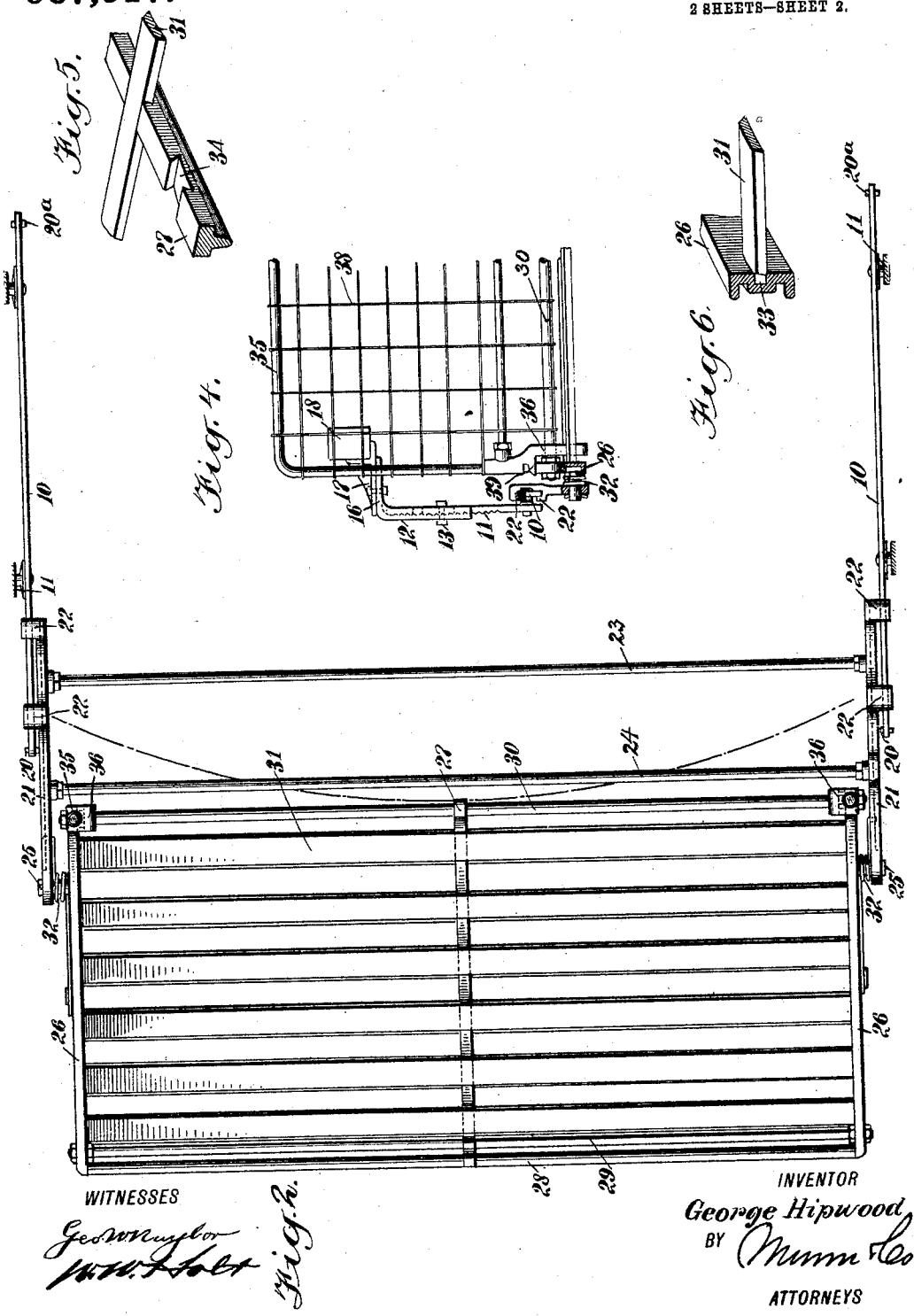

UNITED STATES PATENT OFFICE.

GEORGE HIPWOOD, OF NEW YORK, N. Y.

CAR-FENDER.

967,917.

Specification of Letters Patent.   Patented Aug. 23, 1910.

Application filed November 26, 1909.   Serial No. 529,916.

*To all whom it may concern:*

Be it known that I, GEORGE HIPWOOD, a citizen of the United States, and a resident of the city of New York, borough of Manhattan, in the county and State of New York, have invented a new and Improved Car-Fender, of which the following is a full, clear, and exact description.

The invention is an improvement in fenders of the character disclosed in Letters Patent Number 730,913, granted to me June 16, 1903, wherein the fender is shown to be made up of a horizontally-extending portion or main fender, a normally vertically-extending portion or supplemental fender pivoted to the main fender to fold thereon, and a track arranged under the car or other vehicle on which the fender is supported and adapted to be shifted to a removed position when the two portions of the fender are folded together.

The present invention has for its purpose to simplify the construction, and resides in certain special features as will be hereinafter pointed out in the claims annexed.

Reference is to be had to the accompanying drawings forming a part of this specification, in which similar characters of reference indicate corresponding parts in all the views.

Figure 1 is a central vertical longitudinal section of a fender constructed in accordance with my invention as applied to an electric or other power-driven car, the latter being also shown in section; Fig. 2 is a horizontal section on the line 2—2 of Fig. 1, looking in the direction of the arrow; Fig. 3 is a sectional view similar to Fig. 1, showing the two portions of the fender folded together and shifted underneath the car on the supporting track; Fig. 4 is a fragmentary sectional view on the line 4—4 of Fig. 1, looking in the direction of the arrow; Fig. 5 is a fragmentary perspective view, showing the manner of uniting the slats of the main fender with the intermediate longitudinal bar; Fig. 6 is a similar view, showing the connection between the slats and the side bars of the frame of the main fender; Fig. 7 is a section through the device for dropping the forward portion of the main fender to the ground from the platform of the car, the section being taken substantially on the line 7—7 of Fig. 8; and Fig. 8 is a section of the same on the line 8—8 of Fig. 7, the figure also showing the chain ring which engages the depressible bolt of the device.

Arranged under the forward end of a vehicle, generally the platform of an electric car, is a track composed of two rails 10, 10 spaced apart a suitable distance and each supported on hangers, with each hanger constructed of two overlapping sections 11 and 12, the overlapping portions of both sections having serrated or toothed faces clamped together by a bolt 13 passing through a longitudinal slot 14 in the lower section 11. The upper section 12 of each hanger is constructed with marginal ribs or flanges 15 engaging the edges of the hanger section 11 at opposite sides, and, as best shown in Fig. 4, is provided with an offset foot 16 seated against and adjustably secured to an angle bracket 17, which in turn is secured to one of the longitudinal sills 18 of the car or vehicle. By the two adjustments afforded the hangers, the same may be moved laterally on their respective brackets to spread the rails apart or bring them closer together, or the overlapping sections of the hangers may be adjusted to drop or elevate the rails. The forward ends of the rails are notched or bifurcated, as best shown in dotted outline in Fig. 1, with the portion 19 of the rail at the under side of the notch or bifurcation extending a substantial distance beyond the corresponding upper portion and provided with a stop pin or projection 20. A similar stop pin 20ª is arranged adjacent to the inner end of each rail.

Slidably supported on each rail 10 is an arm 21, the connection between the arm and rail being effected by providing the arm, as best shown in Figs. 2 and 4, with fingers 22 arranged at the inner end of the arm and respectively engaging with the top and bottom edges of the rail, with the upper and forward finger, as best shown in dotted outline in Fig. 1, made in the form of a hook or projection to engage in the notch at the forward end of the rail. The arms are rigidly secured together by cross-bars 23 and 24, and at their outer ends receive the trunnions or pivots 25 of the main fender, the same comprising side bars 26, an intermediate bar 27, a front bar 28, front and rear rods or cross-bolts 29 and 30 respectively, and slats 31. The trunnions or pivot pins 25 project from the outer sides of the side bars 26 intermediate their length and carry springs 32 coiled thereabout and having their ends respectively fixed to the arms and to the side bars 26 and exerting a force tending to throw the forward end of the main fender to the ground. The side bars 26 are provided with sockets 33 in their inner faces to receive the ends of the slats 31; and the intermediate bar 27, as shown in Fig. 5, is provided with dove-tailed slots 34 in its upper face to receive and secure the slats at intermediate points, the slats, as shown, being beveled at the edges to conform to the dove-tailing of the slots. In assembling this portion of the fender the slats are first passed into the slots of the intermediate bar 27, after which the side bars 26 are forced together by the nuts on the ends of the front and rear rods or bolts 29 and 30, operating to force the ends of the slats in the sockets 33 of the side bars 26. As shown in Figs. 1 and 3, the inner ends of the side bars 26 are turned upwardly and serve to pivotally support a supplemental fender or bumper guard 35, the pivotal connection between the two fenders being effected by the rod 30, which is shown to pass through the intermediate portions of dogs 36, forming a part of the supplemental fender, each dog having a socket in its upper or outer end, in which is adjustably secured by set-screw 37, the pipe or bar constituting the marginal frame of the supplemental fender, the latter being covered over with a netting 38 or other suitable material. The dogs 36 above their points of pivotal support are each provided with a shoulder 39 arranged to contact with the upwardly-turned ends of the side bars 26 and prevent further separation between the main fender and the supplemental fender when the two fenders are at approximately right angles to each other. That portion of the dog below the point of pivotal connection between the two fenders is slightly hooked, as shown in Fig. 1, and is adapted to engage with the cross-bar 24 in the act of folding the supplemental fender on the main fender and raising the outer end of the main fender above the ground. When the two fenders are folded together by first drawing them outwardly to disengage the forward hooks or projections of the arms 21 from the bifurcated outer ends of the rails 10 and then lifting the fender with the arms upwardly to raise the under sides of the said hooks or projections to the top of the rails, the fender and arms may be shifted to a removed position at the under side of the car, as illustrated in Fig. 3. In drawing the fender outwardly to disengage the hooks or projections of the arms from the notches in the rails, the arms are prevented from leaving the forward ends of the track by the stop pins 20, and are prevented from leaving the rear ends of the track when the fender is moved under the car by the stop pins 20¹.

To the platform of the car is secured a device for controlling the release of the fender, comprising a post 40 having a guideway 41 extending through its base or bottom to a point near its upper end, in which is slidable a bolt 42, the bolt having a slot through which a foot-lever 43 passes and which bolt is normally drawn upwardly to extend a substantial distance above the post, by a spring 44. The foot-lever 43 has a toe 45 removably engaged under a keeper 46, which admits of the lever being removed from the post and bolt without the use of tools.

A chain 47 has a hook 48 at its outer end adapted to removably engage with the frame of the supplemental fender 35 and extends through an opening in the dashboard of the car, where it is provided at its inner end with a ring 49 adapted to engage over the projected upper end portion of the bolt, the ring having laterally-extending fingers 50 for drawing the chain inwardly and raising the main fender in engaging the ring. The device for releasing the chain is placed as shown in Fig. 1, with the foot lever projecting to one side, where it is out of the way of the ordinary movements of the motorman or operator. The motorman observing that any one is in danger of being struck by the car depresses the foot lever, which releases the inner end of the chain, permitting the main fender to drop to the ground, as shown in dotted outline, under the influence of its weight and the springs 32, the main fender drawing the supplemental fender or bumper guard outwardly to the desired position, where its further outward movement is arrested by the chain ring 49 engaging the car dashboard. In these positions of the fenders the body will be picked up and prevented from passing under the car.

Having thus described my invention, I claim as new and desire to secure by Letters Patent:

1. The combination of a vehicle, a track supported under the vehicle, arms movable over the track, a main fender pivotally supported intermediate its length on the arms, and a supplemental fender foldable on the main fender and having means to engage the main arms and lift the forward end of the main fender from the ground in folding the supplemental fender on the main fender.

2. The combination of a vehicle, a main fender pivotally supported intermediate its length at the front of the vehicle and having side bars, and a supplemental fender pivotally supported at the inner end of the main fender and adapted to fold thereon and having shoulders adapted to engage with the side bars and raise the outer end of the main fender when the supplemental fender is swung toward the vehicle.

3. The combination of a vehicle, a main fender pivotally supported intermediate its length at the front of the vehicle, having side bars provided with upwardly-turned inner end portions, a supplemental fender pivotally connected to the inner end of the main fender and foldable thereon and provided with shoulders arranged to engage the upwardly-turned inner ends of the side bars and prevent the further separation of the fenders.

4. The combination of a vehicle, a track supported under the vehicle, arms movable on the track, a main fender pivotally supported intermediate its length on the outer ends of the arms, a cross-bar connecting the arms, and a supplemental fender pivotally supported on the inner end of the main fender to fold thereon and having means to engage under the cross-bar and lift the forward end of the main fender above the ground when the supplemental fender is folded on the main fender.

5. The combination of a vehicle, rails supported under the vehicle, arms movable on the rails, having means adapted to drop into engagement with the forward ends thereof and lock the arms against an inward and vertical movement, a main fender pivotally supported on the arms, and a supplemental fender pivotally supported and foldable on the main fender.

6. The combination of a vehicle, rails supported under the vehicle having bifurcated forward ends, the portion of each rail below the bifurcation being extended beyond the portion above, arms movable on the rails, each having a projection arranged to drop down on the extended end portion of the rail and pass into the bifurcation, and a fender carried on the arm.

7. The combination of rails, arms movably supported on the rails, the rails at their outer ends and the arms having interfitting portions adapted to engage when the arms are drawn outwardly and lock the arms against inward vertical movement, a main fender pivotally supported on the arms, and a supplemental fender pivotally supported and foldable on the main fender.

8. The combination of a vehicle, a main fender pivotally supported at the front of the vehicle, a supplemental fender foldable and pivotally supported on the inner end of the main fender and having means to engage the main fender and raise the outer end thereof above the ground when the supplemental fender is moved inwardly toward the vehicle, a device carried by the vehicle and having a depressible bolt, and a connection extending from the upper portion of the supplemental fender and adapted to engage over said bolt.

9. The combination of a vehicle, a main fender pivotally supported intermediate its length at the front of the vehicle, a supplemental fender pivotally connected to the inner end of the main fender and foldable thereon, said supplemental fender having means to engage the main fender and raise the outer end thereof in moving the supplemental fender toward the vehicle, a device carried by the vehicle, having a bolt, a member adapted to connect the upper portion of the supplemental fender to the bolt and having a limited outward movement, and a foot-lever to operate the bolt to disengage said member.

10. The combination of a vehicle, hangers secured to the under side of the vehicle, having overlapping sections adjustably connected, a track supported on the hangers, arms movably supported on the track, a main fender pivotally supported intermediate its length on the arms, and a supplemental fender pivotally supported on the inner end of the main fender and foldable thereon and having means to raise the outer end of the main fender above the ground in moving the supplemental fender toward the vehicle.

11. The combination of a vehicle, a track supported under the vehicle, arms movable on the track, a cross-bar rigidly securing the arms together, a main fender having trunnions journaled in the outer portions of the arms, springs coiled about the pivots tending to force the outer portion of the main fender to the ground, a supplemental fender pivotally supported on the inner end of the main fender to fold thereon and having means to engage the main fender and raise the outer end thereof in moving the supplemental fender toward the vehicle, and means to engage the cross-bar of the arms and raise the outer end of the main fender in folding the supplemental fender thereon.

12. The combination of a vehicle, a main fender pivotally supported intermediate its length at the front of the vehicle, and a supplemental fender pivotally supported at the inner end of the main fender and having means to lift the outer end thereof in both folding the supplemental fender on the main fender and moving the supplemental fender from the main fender toward the vehicle.

13. The combination of a vehicle, a main fender pivotally supported at the front of the vehicle, a supplemental fender connected to the main fender, means for holding the supplemental fender inwardly to raise the outer portion of the main fender above the ground, having a limited outward movement, a post secured to the vehicle, a bolt slidable in the post, a spring normally forcing the bolt to a position to adapt it to engage the said means, and a foot-lever for depressing the bolt against the action of the spring.

14. The combination of a support, a main fender having pivots intermediate its length journaled in the support, springs coiled about the pivots tending to force the outer portion of the fender to the ground, and a supplemental fender pivotally supported to the inner end of the main fender and having means to raise the outer end of the main fender when folded thereon against the action of the spring.

In testimony whereof I have signed my name to this specification in the presence of two subscribing witnesses.

GEORGE HIPWOOD.

Witnesses:
 ARTHUR BUTLER GRAHAM.
 ANNA D. URDANG.